Patented Feb. 5, 1935

1,990,080

UNITED STATES PATENT OFFICE 1,990,080

MOISTUREPROOF MATERIAL

Lloyd L. Leach, Buffalo, and John C. Siemann, Kenmore, N. Y., assignors to Du Pont Cellophane Company, Inc., New York, N. Y., a corporation of Delaware No Drawing. Application February 12, 1932, Serial No. 592,668

24 Claims. (Cl. 91—68)

This application is a continuation-in-part of application Serial No. 410,244, filed November 27, 1929, and relates to moistureproof materials. More particularly, it relates to a moistureproof material in which the moistureproof coating is anchored to the base and to the method of producing the same.

By the term "moistureproof" or equivalent terminology employed in this specification is meant the ability of the coated material to resist the transmission or diffusion of moisture or water vapor therethrough to an extent at least 7 times as great as that displayed by the uncoated material when tested in accordance with the test set forth in the Journal of Industrial and Engineering Chemistry, page 575, vol. 21, No. 6 (June 1929).

By the expressions "anchor", "anchoring", "anchored" or equivalent terminology used herein is meant the securing of the surface coating to the base so that the product will withstand the deleterious effect of water or high moisture to a greater degree than a product in which the intermediate anchoring coating is omitted.

Ordinary sheets or films of regenerated cellulose have been moistureproofed by coating said sheets with a moistureproofing composition comprising in its preferred and most common species a cellulose derivative, a wax with or without a gum or resin, and optionally a plasticizer. These coated sheets or films, in addition to possessing the desired property of moistureproofness, are also transparent, flexible, odorless, non-greasy and non-tacky. This material is used extensively as a wrapping tissue, particularly for wrapping foodstuffs and other products normally susceptible to changing of the moisture content, in order to retain said products in their original and desired state without any change in moisture content for a substantial period of time. In addition to maintaining the contents in the original condition, the wrapper enhances the beauty and appearance of the package.

It has been found that, while these moistureproof sheets or films of regenerated cellulose are resistant to the passage or penetration of moisture or water vapor therethrough, they are not suitable for a prolonged or extended use in contact with products having an exceedingly large amount of moisture or water present. When products having an exceedingly large moisture or water content, such as frozen or wet fish, cheese, butter, fresh vegetables, ice cream or the like, are wrapped in the material, the surface coating loosens and/or flakes off, whereby the effectiveness of the wrapper is very appreciably reduced.

We have found that we can overcome the above mentioned disadvantages by providing a moistureproof material for use as a wrapping tissue in combination with products and substances containing a large quantity of water or having large moisture contents by anchoring the moistureproof coating to the base through the intermediary of a coating disposed between the base and moistureproof coating and comprising vulcanized or unvulcanized rubber with or without modifying ingredients.

It is, therefore, an object of this invention to provide a moistureproof material suitable for use as a wrapping tissue in which the moistureproof surface coating effectively withstands the presence of an exceedingly large amount of moisture or water for a substantial period of time.

Another object of this invention is to provide a moistureproof material having a moistureproof coating directly anchored to the base by means of a coating comprising vulcanized or unvulcanized rubber.

A further object of this invention is to provide a material having a surface coating of a moistureproofing composition securely anchored to the base by means of a coating comprising vulcanized or unvulcanized rubber and including, if desired, a drying oil to increase the tenacity of the bond between the base and anchoring coating and/or a softener to increase the tackiness of the rubber coating and the flexibility of the final product.

Another object of this invention is to provide a method for producing materials having the properties previously set forth.

Other objects will appear from the following description and appended claims.

To achieve the afore-mentioned objects, the instant invention contemplates applying to the selected base, prior to the application of the moistureproofing composition, a coating which firmly adheres to the base and to which the moistureproof surface coating securely attaches itself, whereby the moistureproof coating does not loosen or flake off said base even when the moistureproof product is used in conjunction with substances having an exceedingly high moisture or water content for an apprecible and substantial period of time.

As the base, the invention contemplates any material which is smooth, dense and non-porous. Because of its non-porosity the base is quite impermeable to the moistureproofing composition employed. When such materials are moistureproofed by coating with the selected composition, the latter will not penetrate therethrough or therein and, as a consequence, normally results in a surface coating. Sheets or films of regenerated cellulose, chemically treated paper, as for example papers which have been partly or wholly gelatinized or regenerated, highly calendered papers and even glassine papers may be cited as illustrative examples. In the preferred form of the invention the base is also transparent.

As the moistureproofing composition, the instant invention contemplates any moistureproofing composition which will normally deposit a film on the untreated base which does not withstand the deleterious action of water or high moisture and which contains one or more substances which wets the anchoring coating and/or unites therewith. A moistureproofing composition comprising a cellulose derivative, a wax and a solvent or solvent mixture, with or without gums or resins, and optionally a plasticizer, are cited as illustrative examples. In the preferred embodiment, the moistureproofing composition comprises a cellulose derivative, a gum or resin, a wax, a plasticizer and a solvent mixture of the type specifically set forth in Patent No. 1,826,696.

The anchoring coating comprises a thin film of vulcanized or unvulcanized rubber, with or without modifying ingredients which serve, for example, to increase the anchoring effect. When the effectiveness of the bond between the anchoring coating and the base on one hand and between the anchoring coating and the moistureproof coating on the other is desired to be increased, one or more drying oils, such as linseed oil, China-wood oil, etc., may constitute at lest one of the components of the anchoring coating. When the base to be moistureproofed consists of regenerated cellulose containing a high percentage of glycerin and/or water, a somewhat better bond is produced between the base and the anchoring coating, if in the anchoring coating composition there is present a material which dissolves or wets the glycerin or water in the base. The material may be a volatile solvent, such as ethyl acetate, ethylene glycol monoethyl ether, ethylene glycol monomethyl ether, or non-volatile substances, such as ethylene glycol monobutyl ether, ethyl lactate or ethyl oxybutyrate. The non-volatile material also serves to improve the tackiness of the anchoring coating and the flexibility of the resultant product.

In the preferred form of the invention, the rubber coating is deposited from a solution of rubber in a volatile solvent, such as naphtha, toluene, etc.

The vulcanization of the coating may be secured through the incoporation of vulcanizing agents and accelerators in the anchoring coating composition. Alternatively, the rubber coating may be vulcanized by the so-called dry cure. According to this procedure, after the rubber coating has been deposited and the volatile solvent eliminated, the coated material is subjected to a vulcanizing agent, such as sulphuryl chloride, and then subsequently treated with ammonia.

It is to be noted that when the composition contains a drying oil, the latter will also be vulcanized.

In order to more clearly describe this invention, the following specific examples are set forth. Since the invention, when applied to sheets or films of regenerated cellulose, presents greater difficulties than when applied to the other bases, several specific illustrative procedures of the invention will be described in connection with sheets or films of regenerated cellulose. It is to be understood that these examples are not limitative of the invention but merely describe several illustrative modifications of practicing and carrying out the invention.

*Example I.*—A solution of 1 gram of crepe rubber in 100 cc. of toluene is evenly spread in a thin layer on both sides of a sheet or film of regenerated cellulose. The coated sheet is then dried at a temperature sufficient to insure the substantially complete removal of the toluene. After drying, the coated sheet is then coated with the selected moistureproofing composition, such as one comprising a cellulose derivative, a gum or resin, a wax and a plasticizer. The thus coated film is subjected to a drying operation at a temperature at least equal to the melting point of the wax employed in such a composition. If desired, the coated material may be subjected to a humidifying operation.

The product resulting from the procedure just described is perfectly transparent, flexible, non-tacky and non-odorous as well as resistant to the penetration or passage of water vapor therethrough. When this product is immersed in water at room temperature, the surface coating will not be removed or loosened from the base for a period which is at least 5 times as long as would be the case with coated regenerated cellulose made without the use of the anchoring coating.

*Example II.*—A solution comprising 1 gram of crepe rubber and 0.5 grams of linseed oil dissolved in 100 cc. of a solvent containing 80 cc. of toluene and 20 cc. of ethylene glycol monobutyl ether is applied evenly on both sides of a sheet or film of regenerated cellulose. After coating, the material is subjected to a temperature sufficient to insure evaporation of the solvent. The coated sheet is then exposed to an atmosphere of sulphuryl chloride, whereby the rubber is vulcanized. In cases where vulcanizable oils are used in combination with the rubber, said oils will also be vulcanized. The product is subsequently treated with ammonia gas in order to neutralize any acid or acid products. Subsequently, the coated sheet is coated with the chosen surface coating composition and finished as set forth in Example I.

The product resulting from this procedure, when immersed in water at room temperature, retains the surface coating for a period which is at least 5 times longer than is the case with the ordinary sheets or films of regenerated cellulose and in many instances 200 times longer. In addition to this the product has the desirable properties of transparency, flexibility, etc.

*Example III.*—A composition comprising 100 parts of rubber, 10 parts of zinc stearate, 5 parts of sulphur, and 10 parts of accelerator is treated in a solvent, such as toluene, or in a mixture of solvents, such as toluene and ethylene glycol monoethyl ether, so that the rubber forms approximately 1% of the solution. The accelerator may be of the usual type. Preferably, it is of the ultra acceleartor type, as speed and low temperature are desirable. The zinc compound may be omitted and an accelerator comprising a zinc salt may be used instead. The solution produced as just described is applied to both sides of sheets of regenerated cellulose and the sheets dried in order to effect the evaporation of the solvent. Subsequently, the sheet is subjected to a temperature sufficient to insure vulcanization of the rubber. After vulcanization, the rubber coated material is treated with the desired surface coating composition and finished as set forth under Example I.

The product produced as above described, when immersed in water at room temperature, will not show any loosening or removal of the surface coating for a period which is approximately 5 times as long as would be the case with sheets or films of regenerated cellulose coated with a surfacing composition without any anchoring medium. In addition to this, the product is transparent, flexible, non-tacky, non-odorous and non-greasy. Obviously, the product of the instant invention is admirably suited for wrapping substances containing a large quantity of moisture or indeed water and maintaining said substances in their original state.

It is obvious that various changes may be made in the specified details above set forth and accordingly this invention is not limited thereto except as set forth in the appended claims.

We claim:

1. A flexible and moistureproof article of manufacture comprising a sheet or film of a cellulosic material having a smooth, dense and non-porous surface, a transparent coating comprising rubber on said sheet or film, and a transparent moistureproof coating on said first-named coating whereby the moistureproof coating is anchored to said sheet or film.

2. A flexible and moistureproof article of manufacture comprising a sheet or film of a cellulosic material having a smooth, dense and non-porous surface, a transparent coating comprising rubber on said sheet or film, and a transparent moistureproof coating comprising a cellulose derivative and a wax on said first-named coating whereby the moistureproof coating is anchored to said sheet or film.

3. A flexible and moistureproof article of manufacture comprising a sheet or film of a cellulosic material having a smooth, dense and non-porous surface, a transparent coating comprising rubber on said sheet or film, and a transparent moistureproof coating comprising a cellulose derivative, a gum or resin, a wax and a plasticizer on said first-named coating whereby the moistureproof coating is anchored to said sheet or film.

4. A flexible and moistureproof article of manufacture comprising a sheet or film of a cellulosic material having a smooth, dense and non-porous surface, a transparent coating comprising rubber and a drying oil on said sheet or film, and a transparent moistureproof coating on said first-named coating whereby the moistureproof coating is anchored to said sheet or film.

5. A flexible and moistureproof article of manufacture comprising a sheet or film of a cellulosic material having a smooth, dense and non-porous surface, a transparent coating comprising rubber and a drying oil on said sheet or film, and a transparent moistureproof coating comprising a cellulose derivative and a wax on said first-named coating whereby the moistureproof coating is anchored to said sheet or film.

6. A flexible and moistureproof article of manufacture comprising a sheet or film of a cellulosic material having a smooth, dense and non-porous surface, a transparent coating comprising rubber and a drying oil on said sheet or film, and a transparent moistureproof coating comprising a cellulose derivative, a gum or resin, a wax and a plasticizer on said first-named coating whereby the moistureproof coating is anchored to said sheet or film.

7. A flexible and moistureproof article of manufacture comprising a sheet or film of a cellulosic material having a smooth, dense and non-porous surface, a transparent coating comprising vulcanized rubber on said sheet or film, and a transparent moistureproof coating on said first-named coating whereby the moistureproof coating is anchored to said sheet or film.

8. A flexible and moistureproof article of manufacture comprising a sheet or film of a cellulosic material having a smooth, dense and non-porous surface, a transparent coating comprising vulcanized rubber on said sheet or film, and a transparent moistureproof coating comprising a cellulose derivative and a wax on said first-named coating whereby the moistureproof coating is anchored to said sheet or film.

9. A flexible and moistureproof article of manufacture comprising a sheet or film of a cellulosic material having a smooth, dense and non-porous surface, a transparent coating comprising vulcanized rubber on said sheet or film, and a transparent moistureproof coating comprising a cellulose derivative, a gum or resin, a wax and a plasticizer on said first-named coating whereby the moistureproof coating is anchored to said sheet or film.

10. A flexible and moistureproof article of manufacture comprising a sheet or film of a cellulosic material having a smooth, dense and non-porous surface, a transparent coating comprising vulcanized rubber and a vulcanized drying oil on said sheet or film, and a transparent moistureproof coating on said first-named coating whereby the moistureproof coating is anchored to said sheet or film.

11. A flexible and moistureproof article of manufacture comprising a sheet or film of a cellulosic material having a smooth, dense and non-porous surface, a transparent coating comprising vulcanized rubber and a vulcanized drying oil on said sheet or film, and a transparent moistureproof coating comprising a cellulose derivative and a wax on said first-named coating whereby the moistureproof coating is anchored to said sheet or film.

12. A flexible and moistureproof article of manufacture comprising a sheet or film of a cellulosic material having a smooth, dense and non-porous surface, a transparent coating comprising vulcanized rubber and a vulcanized drying oil on said sheet or film, and a transparent moistureproof coating comprising a cellulose derivative, a gum or resin, a wax and a plasticizer on said first-named coating whereby the moistureproof coating is anchored to said sheet or film.

13. A flexible, transparent and moistureproof article of manufacture comprising a transparent sheet or film of regenerated cellulose, a transparent coating comprising rubber on said sheet or film, and a transparent moistureproof coating on said first-named coating whereby the moistureproof coating is anchored to said sheet or film.

14. A flexible, transparent and moistureproof article of manufacture comprising a transparent sheet or film of regenerated cellulose, a transparent coating comprising rubber on said sheet or film, and a transparent moistureproof coating comprising a cellulose derivative and a wax on said first-named coating whereby the moistureproof coating is anchored to said sheet or film.

15. A flexible, transparent and moistureproof article of manufacture comprising a transparent sheet or film of regenerated cellulose, a transparent coating comprising rubber on said sheet or film, and a transparent moistureproof coating comprising a cellulose derivative, a gum or resin, a wax and a plasticizer on said first-named coating whereby the moistureproof coating is anchored to said sheet or film.

16. A flexible, transparent and moistureproof article of manufacture comprising a transparent sheet or film of regenerated cellulose, a transparent coating comprising rubber and a drying oil on said sheet or film, and a transparent moistureproof coating on said first-named coating whereby the moistureproof coating is anchored to said sheet or film.

17. An flexible, transparent and moistureproof article of manufacture comprising a transparent sheet or film of regenerated cellulose, a transparent coating comprising rubber and a drying oil on said sheet or film, and a transparent moistureproof coating comprising a cellulose derivative and a wax on said first-named coating whereby the moistureproof coating is anchored to said sheet or film.

18. A flexible, transparent and moistureproof article of manufacture comprising a transparent sheet or film of regenerated cellulose, a transparent coating comprising rubber and a drying oil on said sheet or film, and a transparent moistureproof coating comprising a cellulose derivative, a gum or resin, a wax and a plasticizer on said first-named coating whereby the moistureproof coating is anchored to said sheet or film.

19. A flexible, transparent and moistureproof article of manufacture comprising a transparent sheet or film of regenerated cellulose, a transparent coating comprising vulcanized rubber on said sheet or film, and a transparent moistureproof coating on said first-named coating whereby the moistureproof coating is anchored to said sheet or film.

20. A flexible, transparent and moistureproof article of manufacture comprising a transparent sheet or film of regenerated cellulose, a transparent coating comprising vulcanized rubber on said sheet or film, and a transparent moistureproof coating comprising a cellulose derivative and a wax on said first-named coating whereby the moistureproof coating is anchored to said sheet or film.

21. A flexible, transparent and moistureproof article of manufacture comprising a transparent sheet or film of regenerated cellulose, a transparent coating comprising vulcanized rubber on said sheet or film, and a transparent moistureproof coating comprising a cellulose derivative, a gum or resin, a wax and a plasticizer on said first-named coating whereby the moistureproof coating is anchored to said sheet or film.

22. A flexible, transparent and moistureproof article of manufacture comprising a transparent sheet or film of regenerated cellulose, a transparent coating comprising vulcanized rubber and a vulcanized drying oil on said sheet or film, and a transparent moistureproof coating on said first-named coating whereby the moistureproof coating is anchored to said sheet or film.

23. A flexible, transparent and moistureproof article of manufacture comprising a transparent sheet or film of regenerated cellulose, a transparent coating comprising vulcanized rubber and a vulcanized drying oil on said sheet or film, and a transparent moistureproof coating comprising a cellulose derivative and a wax on said first-named coating whereby the moistureproof coating is anchored to said sheet or film.

24. A flexible, transparent and moistureproof article of manufacture comprising a transparent sheet or film of regenerated cellulose, a transparent coating comprising vulcanized rubber and a vulcanized drying oil on said sheet or film, and a transparent moistureproof coating comprising a cellulose derivative, a gum or resin, a wax and a plasticizer on said first-named coating whereby the moistureproof coating is anchored to said sheet or film.

LLOYD L. LEACH.
JOHN C. SIEMANN.